(12) United States Patent  (10) Patent No.: US 7,483,131 B2
Takamizawa et al.  (45) Date of Patent: Jan. 27, 2009

(54) LASER-SCANNING MICROSCOPE AND MICROSCOPE OBSERVATION METHOD

(75) Inventors: Nobuhiro Takamizawa, La Jolla, CA (US); Tatsuo Nakata, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/799,196

(22) Filed: May 1, 2007

(65) Prior Publication Data

US 2007/0263282 A1  Nov. 15, 2007

(30) Foreign Application Priority Data

May 11, 2006  (JP)  ............................. 2006-132674

(51) Int. Cl.
  *G01J 3/30*  (2006.01)
(52) U.S. Cl. ...................... 356/318; 250/458.1; 250/234
(58) Field of Classification Search ................. 356/318; 250/458.1, 216, 234
  See application file for complete search history.

(56) References Cited

U.S. PATENT DOCUMENTS 6,094,300 A  7/2000  Kashima

2002/0020800 A1  2/2002  Knebel et al.
2002/0162955 A1*  11/2002  Engelhardt .................. 250/234
2005/0122579 A1  6/2005  Sasaki
2007/0051869 A1  3/2007  Knebel

FOREIGN PATENT DOCUMENTS

DE  10 2004 034 998 A1  2/2006
WO  WO 2005/096058 A1  10/2005
WO  WO 2006/003178 A1 *  1/2006

* cited by examiner

*Primary Examiner*—Kara E Geisel
*Assistant Examiner*—Abdullahi Nur
(74) *Attorney, Agent, or Firm*—Frishauf, Holtz, Goodman & Chick, P.C.

(57) ABSTRACT

An observation laser beam for observing a specimen and a manipulation laser beam for manipulating the specimen are multiplexed; the multiplexed beams irradiate the specimen, which is mounted on a stage, via an objective lens; and fluorescence emitted from inside the specimen in the observation optical axis direction is detected. In a preparation mode, a focal-position adjusting unit is controlled so that the focal position of the observation laser beam and the focal position of the manipulation laser beam are coincident, independent of the movement of the objective lens or the stage by a focusing mechanism; and in an observation mode, the focal-position adjusting unit is controlled so as to cancel out the shift of the focal position of the manipulation laser beam according to the movement of the objective lens or the stage.

11 Claims, 8 Drawing Sheets

ORIGIN —

LASER-SCANNING MICROSCOPE AND MICROSCOPE OBSERVATION METHOD

BACKGROUND OF THE INVENTION

1. Field of the Invention

The present invention relates to laser-scanning microscopes, and more particularly, to a laser-scanning microscope and a microscope observation method in which an observation laser beam and a manipulation laser beam are multiplexed and irradiate a specimen via the same objective lens.

This application is based on Japanese Patent Application No. 2006-132674, the content of which is incorporated herein by reference.

2. Description of Related Art

In the related art, there are known laser-scanning microscopes that are provided with an observation-laser-beam light source and a manipulation-laser-beam light source and that two-dimensionally scan an observation laser beam and a manipulation laser beam on a specimen using independent scanning units.

For example, US Patent Application, Publication No. 2002/0020800 discloses a laser-scanning microscope provided with a movable focusing mechanism for changing the focal position of a manipulation laser beam, enabling the focal position of the manipulation laser beam to be changed along an optical axis direction. US Patent Application, Publication No. 2002/0020800 also discloses using the manipulation laser beam as optical tweezers. More specifically, it is disclosed that, by radiating the manipulation laser beam at various different manipulation sites by operating scanning (deflecting) means for the manipulation laser beam in a plane parallel to the focal plane of the objective lens, those manipulation sites are gripped with the optical tweezers.

In a laser-scanning microscope like that described above, it is desired to acquire a three-dimensional fluorescence image of the specimen by gripping a plurality of sites on the specimen and three-dimensionally scanning the observation laser beam while keeping this state, that is, while keeping the gripping sites gripped by the optical tweezers. However, when the specimen is irradiated with an observation laser beam and a manipulation laser beam via the same objective lens, moving the objective lens or a stage on which the specimen is mounted to change the focal position of the observation laser beam causes the focal position of the manipulation laser beam to also move together with this movement.

BRIEF SUMMARY OF THE INVENTION

The present invention provides a laser-scanning microscope and a microscope observation method in which, when irradiating a specimen with an observation laser beam and a manipulation laser beam via the same objective lens, a desired location in the specimen can be three-dimensionally observed while keeping the manipulation laser beam focused at the same position on the specimen.

A first aspect of the present invention is a laser-scanning microscope comprising an observation-laser-beam light source configured to emit an observation laser beam; a manipulation-laser-beam light source configured to emit a manipulation laser beam for manipulating a specimen; a scanning unit configured to two-dimensionally scan the observation laser beam; a laser-beam position adjusting unit configured to two-dimensionally adjust an irradiation position of the manipulation laser beam; a focal-position adjusting unit configured to move a focal position of the manipulation laser beam in an optical axis direction; a multiplexer configured to multiplex the observation laser beam scanned by the scanning unit and the manipulation laser beam adjusted by the laser-beam position adjusting unit and the focal-position adjusting unit; an objective lens configured to focus the observation laser beam and the manipulation laser beam multiplexed by the multiplexer to irradiate the specimen, as well as to collect fluorescence generated in the specimen; a light detector configured to detect the fluorescence collected by the objective lens; a Z-axis driving unit configured to move, in the optical axis direction, the objective lens or a stage on which the specimen is mounted; a controller configured to control the focal-position adjusting unit and the amount of movement of the objective lens or the stage via the Z-axis driving unit; and a mode-switching unit configured to switch between a preparation mode in which the controller controls the focal-position adjusting unit so that the focal plane of the observation laser beam and the focal position of the manipulation laser beam are coincident, independent of the movement of the objective lens or the stage by the Z-axis driving unit, and an observation mode in which the controller controls the focal-position adjusting unit so as to cancel out a shift of the focal position of the manipulation laser beam with respect to the specimen according to the movement of the objective lens or the stage.

With the laser-scanning microscope described above, the observation laser beam emitted from the observation-laser-beam light source is two-dimensionally scanned by the scanning unit and focused onto the specimen by the objective lens. On the other hand, the manipulation laser beam emitted from the manipulation-laser-beam light source is two-dimensionally adjusted in position by operating the laser-beam position adjusting unit, and the focal position thereof is adjusted by operating the focal-position adjusting unit. Thereafter, it is multiplexed with the observation laser beam by the multiplexer and is focused onto the specimen by the objective lens.

By focusing the observation laser beam on the specimen, a fluorescent substance inside the specimen is excited, generating fluorescence. The generated fluorescence returns via the objective lens, the multiplexer, and the scanning unit and is detected by the light detector. A fluorescence image is constructed based on information about the manipulation position on the specimen by the scanning unit and intensity information of the fluorescence detected by the light detector. In addition, by moving the objective lens or the stage in the optical axis direction by operating the Z-axis driving unit, the focal position of the observation laser beam inside the specimen is moved in the optical axis direction, and a fluorescence image at any depth inside the specimen is constructed.

On the other hand, by focusing the manipulation laser beam on the specimen using the objective lens, the specimen is manipulated, including optical stimulation, laser trapping (optical tweezers), etc. A plurality of manipulation laser beams can be made incident on the specimen if a construction for emitting a plurality of manipulation laser beams from the manipulation-laser-beam light source is provided. Therefore, it is possible to perform optical stimulation or laser trapping at a plurality of locations.

In such a case, because this aspect of the invention provides the mode-switching unit for switching between the preparation mode and the observation mode, in the preparation mode for example, the focal-position adjusting unit is controlled so that the focal plane of the observation laser beam and the focal position of the manipulation laser beam are coincident, independent of the movement of the objective lens or the stage. By doing so, it is possible to keep the focal position of the manipulation laser beam coincident with the focal plane of the observation laser beam, and therefore, it is possible to determine the position for optical stimulation (gripping with optical tweezers) based on the fluorescence image acquired using the observation laser beam.

In the observation mode, the focal-position adjusting unit is controlled so as to cancel out the shift of the focal position of the manipulation laser beam according to the movement of the objective lens or the stage. By doing so, it is possible to fix the focal position of the manipulation laser beam at a desired location on the specimen even if the focal position of the observation laser beam continuously moves due to the movement of the objective lens or the stage.

As a result, it is possible to move only the focal position of the observation laser beam in the depth direction of the specimen, while performing optical stimulation at the same location on the specimen or while the gripping position of the optical tweezers is always kept fixed at the same location.

A second aspect of the present invention is a microscope observation method in which an observation laser beam for observing a specimen and a manipulation laser beam for manipulating the specimen are multiplexed, wherein the multiplexed beams irradiate the specimen, which is mounted on a stage, via an objective lens, and wherein fluorescence emitted from inside the specimen is detected. The method comprises activating a preparation mode in which, while radiation of the manipulation laser beam to the specimen is stopped, a focal position of the manipulation laser beam is adjusted so that a focal plane of the observation laser beam and the focal position of the manipulation laser beam are coincident, independent of movement in an optical axis direction of the objective lens or the stage, and switching from the preparation mode to an observation mode in which radiation of the manipulation laser beam to the specimen is started and the focal position of the manipulation laser beam is adjusted so as to cancel out a shift of the focal position of the manipulation laser beam with respect to the specimen according to the movement in the optical axis direction of the objective lens or the stage, when the focal position of the manipulation laser beam reaches a desired position.

With the microscope observation method described above, first, by activating the preparation mode, while radiation of the manipulation laser beam is stopped, the focal position of the manipulation laser beam is adjusted so that the focal plane of the observation laser beam and the focal position of the manipulation laser beam are coincident, independent of the movement of the objective lens or the stage. Then, in this preparation mode, once the focal position of the manipulation laser beam reaches a desired position, by switching from the preparation mode to the observation mode, irradiation of the specimen with the manipulation laser beam commences, and in addition, the focal position of the manipulation laser beam is adjusted so as to cancel out the shift of the focal position of the manipulation laser beam with respect to the specimen according to the movement of the objective lens or the stage.

Accordingly, in the preparation mode, even if the focal position of the manipulation laser beam shifts as the objective lens or the stage moves in the optical axis direction, the focal position of the manipulation laser beam is adjusted so that the focal position of the manipulation laser beam and the focal plane of the observation laser beam are coincident. Therefore, it is possible to keep the observation laser beam and the manipulation laser beam focused at the same position. As a result, based on the fluorescence image acquired using the observation laser beam, it is possible to determine the position of the optical stimulation (gripping with the optical tweezers).

In the observation mode, even if the focal position of the manipulation laser beam shifts as the objective lens or the stage moves in the optical axis direction, since the focal position of the manipulation laser beam is adjusted so as to cancel out this shift, it is possible to fix the focal position of the manipulation laser beam relative to the specimen. As a result, it is possible to move only the focal position of the observation laser beam in the depth direction of the specimen, while performing optical stimulation on the specimen or while the gripping location of the optical tweezers remains fixed at the same position.

In the microscope observation method described above, the adjustment of the focal position of the manipulation laser beam is preferably performed in synchronization with detecting the fluorescence of the specimen.

With this method, because the focal position of the manipulation laser beam is adjusted in synchronization with the movement of the objective lens or the stage, it is possible to perform observation more effectively.

The present invention affords an advantage in that it is possible to three-dimensionally observe a desired position in the specimen while keeping the manipulation laser beam focused at the same point on the specimen.

DETAILED DESCRIPTION OF THE INVENTION

A laser-scanning microscope 1 according to an embodiment of the present invention will be described below with reference to FIGS. 1 to 7.

Figure 1:
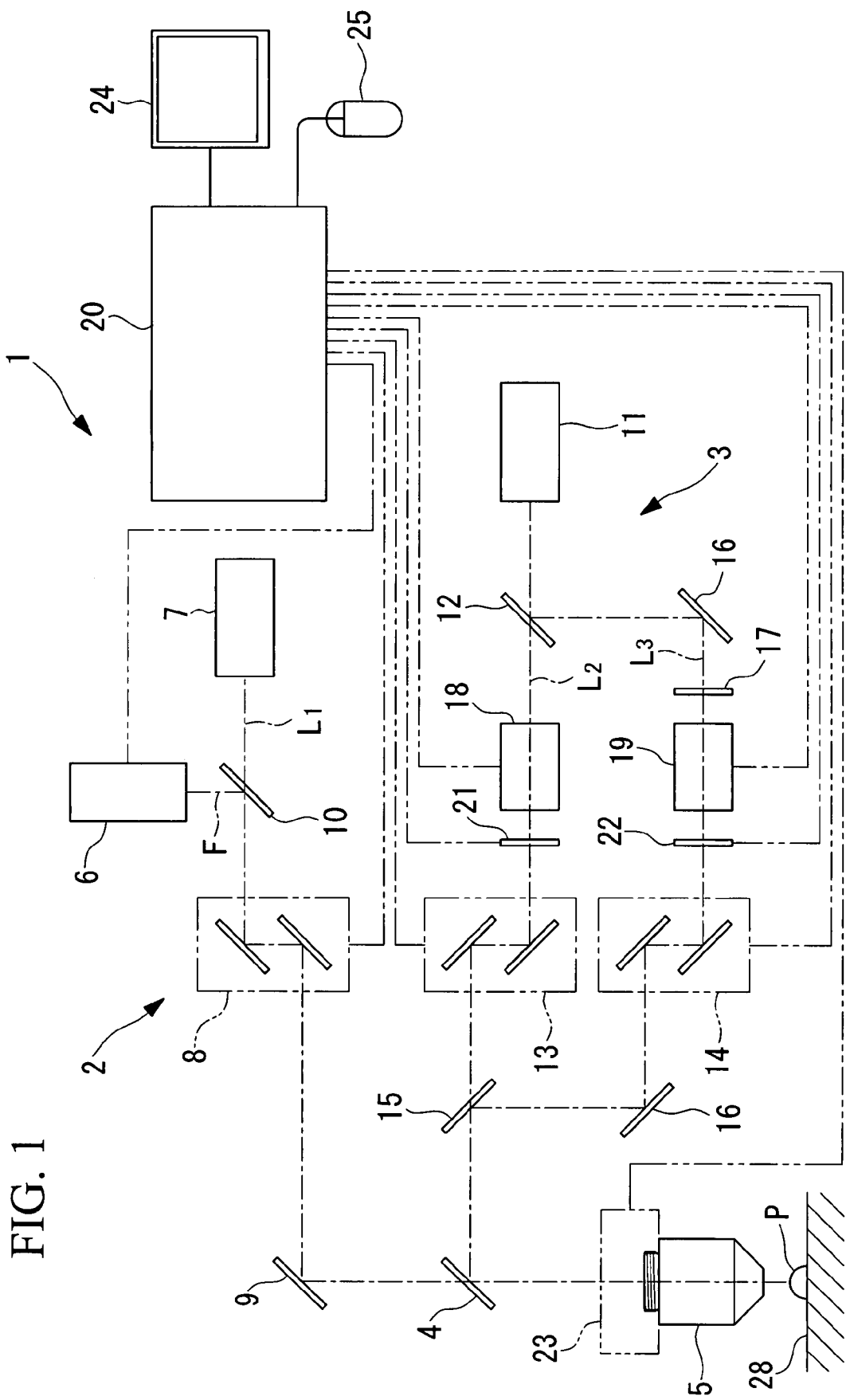
FIG. 1 is a diagram showing the overall configuration of a laser-scanning microscope according to an embodiment of the present invention.

The laser-scanning microscope 1 according to this embodiment is a confocal laser-scanning microscope. In FIG. 1, optical components such as various lenses and pinholes are omitted to simplify the description.

As shown in FIG. 1, the laser-scanning microscope 1 according to this embodiment includes an observation-laser-beam generator 2 for generating an observation laser beam L1; a manipulation-laser-beam generator 3 for generating manipulation laser beams L2 and L3; a dichroic mirror (multiplexer) 4 for multiplexing the observation laser beam L1 and the manipulation laser beams L2 and L3; an objective lens 5 for focusing the multiplexed observation laser beam L1 and the manipulation laser beams L2 and L3 to irradiate a specimen P, as well as for collecting fluorescence F generated in the specimen P upon exciting a fluorescent substance by irradiating the specimen P with the observation laser beam L1; and a light detector 6 for detecting the fluorescence F collected by the objective lens 5.

The observation-laser-beam generator 2 includes an observation-laser-beam light source 7 for emitting the observation laser beam L1 and a first scanner (scanning unit) 8 for two dimensionally scanning the observation laser beam L1 emitted from the observation-laser-beam light source 7 in directions intersecting the optical axis. Reference numeral 9 is a mirror.

Between the observation-laser-beam light source 7 of the observation-laser-beam generator 2 and the first scanner 8, there is a dichroic mirror 10 for splitting off from the observation laser beam L1 the fluorescence F generated in the specimen P, collected by the objective lens 5, and returning along the path via the dichroic mirror 4, the mirror 9, and the first scanner 8, and for directing the split-off fluorescence F towards the light detector 6.

The manipulation-laser-beam generator 3 includes a manipulation-laser-beam light source 11 for emitting the manipulation laser beams L2 and L3; a half-mirror 12 for separating the manipulation laser beams L2 and L3 emitted from the manipulation-laser-beam light source 11; second scanners (laser-beam position adjusting units) 13 and 14 for respectively two-dimensionally adjusting the positions of the two separated manipulation laser beams L2 and L3 in directions intersecting the optical axis; and a polarizing beam splitter 15 for multiplexing the two manipulation laser beams L2 and L3 whose positions are adjusted by the second scanners 13 and 14, respectively. Reference numeral 16 is a mirror.

The manipulation-laser-beam generator 3 also includes a π/2 plate 17 for rotating by 90° the polarization direction of one of the manipulation laser beams, namely, the beam L3, separated by the half mirror 12, and focal-position adjusting units 18 and 19 for adjusting the focal positions of the manipulation laser beams L2 and L3 on the specimen P. The focal-position adjusting units 18 and 19 are formed of wavefront-converting devices, or a plurality of lens groups (not shown in the drawing) supported so that at least one part thereof can move in the optical axis direction.

Shutters 21 and 22, which are controlled to be opened and closed by a control unit 20 described later, are respectively provided in the light paths of the two manipulation laser beams L2 and L3 separated by the half-mirror 12. Instead of the shutters 21 and 22, it is possible to use acousto-optic devices such as AOTFs or AOMs.

By focusing the manipulation laser beams L2 and L3 at locations where actin or myosin binds to the specimen P, they can be used as optical tweezers for holding the specimen P.

The objective lens 5 is supported by a focusing mechanism (Z-axis driving unit) 23 for moving the objective lens 5 along the optical axis.

The focusing mechanism 23 and the focal-position adjusting units 18 and 19 are connected to the control unit (controller) 20. The control unit 20 stores the relationship between the amount of motion of the objective lens 5 by the focusing mechanism 23 and the amount of movement of the focal positions of the two manipulation laser beams L2 and L3 by the focal-position adjusting units 18 and 19.

In an observation mode where the observation laser beam L1 and both of the manipulation laser beams L2 and L3 are radiated, the control unit 20 operates the focal-position adjusting units 18 and 19 in conjunction with the focusing mechanism 23 to move the focal positions of the manipulation laser beams L2 and L3 so as to cancel out the shift of the focal positions of the manipulation laser beams L2 and L3 due to the motion of the objective lens 5. The control unit 20 moves the focal positions of the two manipulation laser beams L2 and L3 by the same distance in a direction opposite the moving direction of the objective lens 5.

In a preparation mode where only the observation laser beam L1 is radiated and the manipulation laser beams L2 and L3 are stopped, the control unit 20 removes this interlocking of the focusing mechanism 23 and the focal-position adjusting units 18 and 19, when the focal position of the observation laser beam L1 and the focal positions of the stopped manipulation laser beams L2 and L3 (that is, the focal positions which would be formed were the manipulation laser beams actually emitted) are aligned.

Accordingly, in the preparation mode, when the focusing mechanism 23 is operated to move the objective lens 5 in the optical axis direction, the focal positions of not only the observation laser beam L1, but also the stopped manipulation laser beams L2 and L3, can be moved in the optical axis direction together with the objective lens 5.

The control unit 20, functioning in this way, includes a computer, for example. The computer is formed of, for example, a CPU (central processor unit), a ROM (read only memory), a RAM (random access memory), and so on. A sequence of processing steps for implementing the various functions described above is stored in the form of a program in the ROM, or similar device, and the CPU reads out the program into the RAM, or similar device, to execute information processing or calculations, thus realizing the various functions.

The light detector 6, the first scanner 8, the second scanners 13 and 14, a monitor 24, and a mouse 25 are connected to the control unit 20.

The control unit 20 constructs a two-dimensional fluorescence image based on scanning-position information of the observation laser beam L1 scanned on the specimen P by the first scanner 8 and light-intensity information of the fluorescence F detected by the light detector 6, and displays the fluorescence image on the monitor 24.

The operation of the laser-scanning microscope 1 according to this embodiment, having such a configuration, will be explained below.

Figure 2:
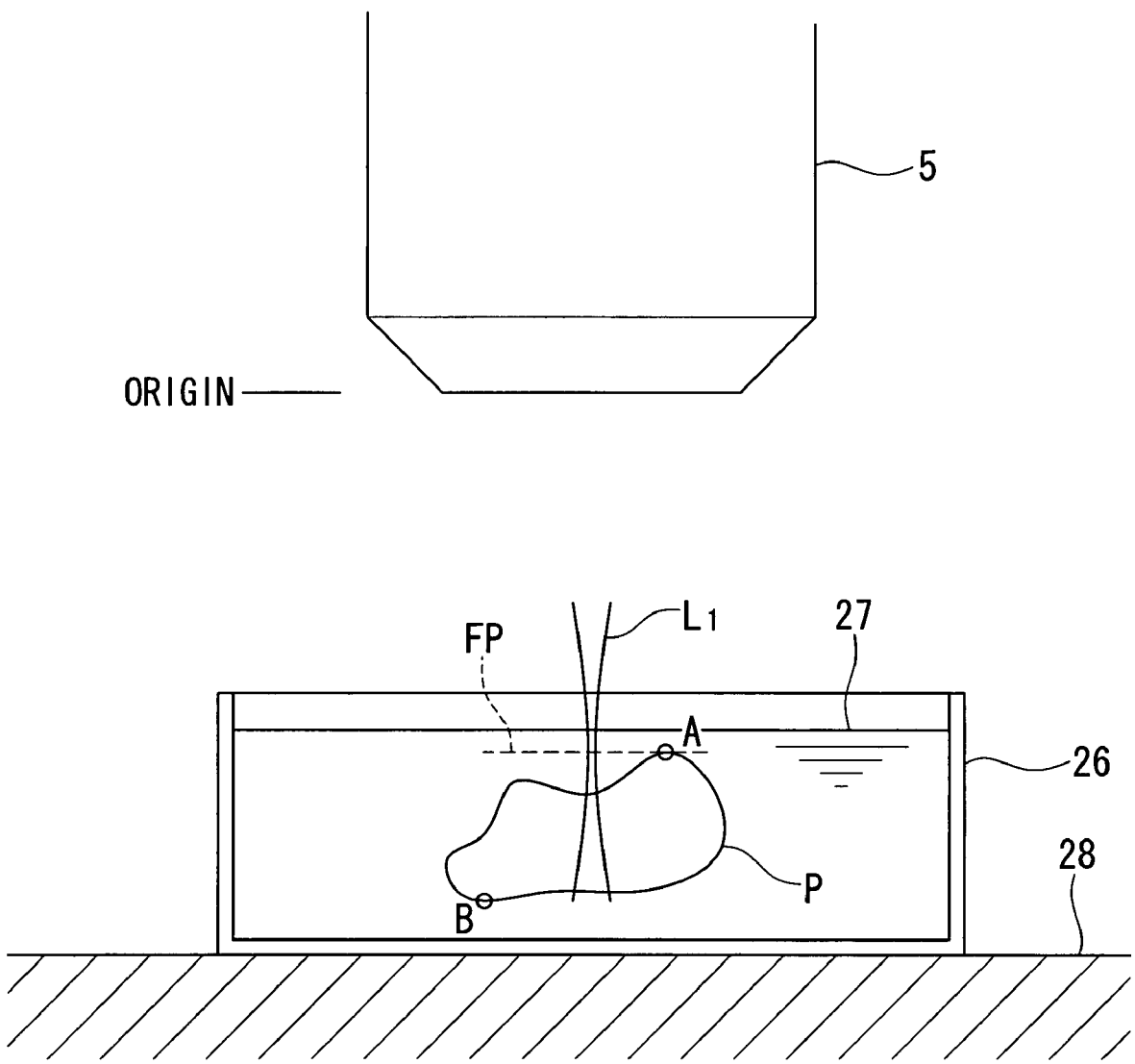
FIG. 2 is an explanatory diagram showing a preparation mode in which only an observation laser beam is radiated from the laser-scanning microscope in FIG. 1 onto a specimen.
Figure 8:
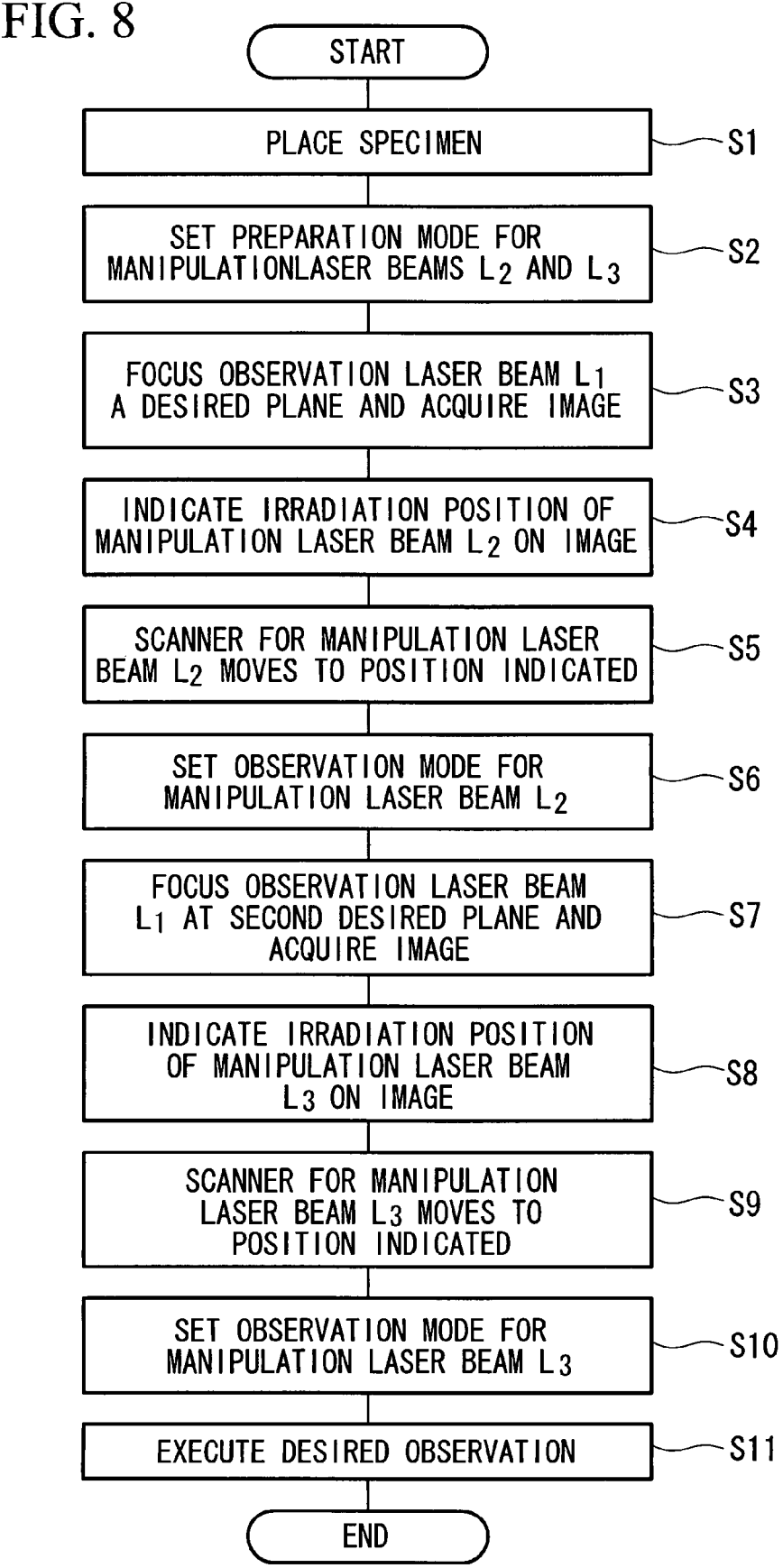
FIG. 8 is a flowchart showing a procedure for observing a specimen using the laser-scanning microscope in FIG. 1.

When using the laser-scanning microscope 1 according to this embodiment to observe the specimen P, for example, cells suspended in a culture medium 27 held in a Petri dish, as shown in FIG. 2, actin or myosin is bound to extremities A and B of the specimen P (step S1 in FIG. 8), and the control unit 20 is switched to the preparation mode (step S2 in FIG. 8: mode-switching unit).

As a result, as shown in FIG. 2, only the observation laser beam L1 from the observation-laser-beam generator 2 irradiates the specimen P, and the two manipulation laser beams L2 and L3 are stopped. The stopping of the manipulation laser beams L2 and L3 is achieved by turning off the manipulation-laser-beam light source 11, closing shutters 21 and 22, or turning off an acousto-optic device. The description given here assumes that it is achieved by closing the shutters 21 and 22.

The operator operates the focusing mechanism 23 to move the objective lens 5 so that, for example, a focal plane FP of the observation laser beam L1 is moved close to the uppermost point of the specimen P, and operates the scanner 8. By doing so, a fluorescence image of the specimen P at the focal plane FP of the observation laser beam L1 is acquired (step S3 in FIG. 8). In the example shown in FIG. 2, because the extremity A of the specimen P is at the uppermost position, a fluorescence image of a cross-section of the uppermost position, including the extremity A, is acquired.

While the operator checks the acquired fluorescence image on the monitor 24, he or she indicates the extremity A on the fluorescence image on the monitor using an input unit, such as the mouse 25 (step S4 in FIG. 8). Accordingly, because the gripping position of the optical tweezers to be formed by the manipulation laser beam L2 is specified, the control unit 20 activates the second scanner 13 to two-dimensionally adjust the irradiation position of the manipulation laser beam L2 to coincide with the specified extremity A (step S5 in FIG. 8); thereafter, the shutter 21 in the light path of this manipulation laser beam L2 is opened to irradiate the specimen P with the manipulation laser beam L2.

Figure 3:
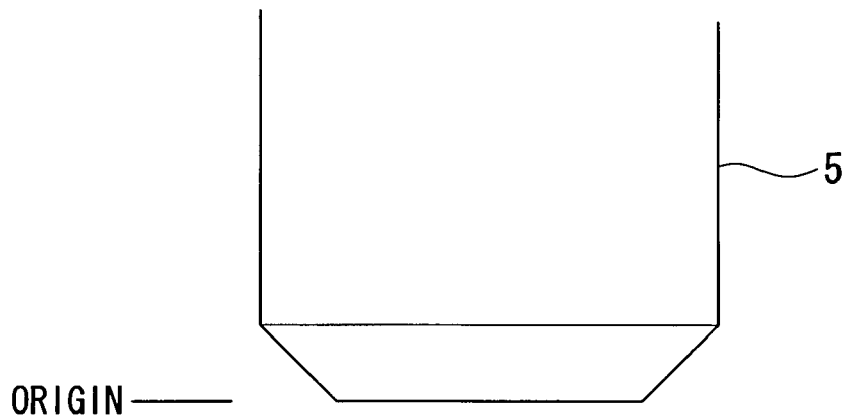
FIG. 3 is an explanatory diagram showing a state in which, at an origin position where the focal plane of the observation laser beam from the laser-scanning microscope in FIG. 1 is aligned with the uppermost position of the specimen, the specimen is irradiated with one manipulation laser beam.
Figure 3:
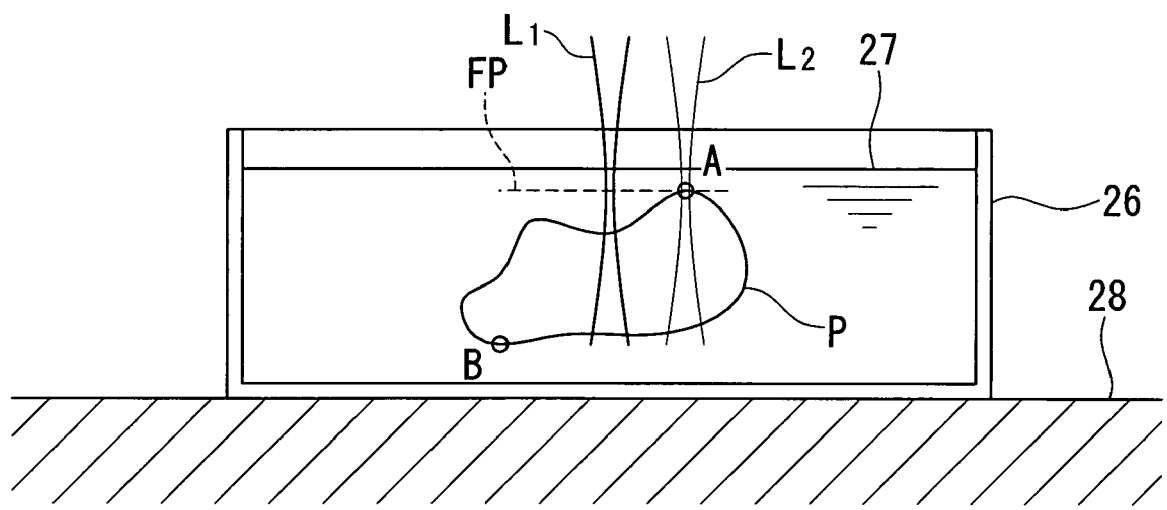

In the preparation mode, because the focal position of the stopped manipulation laser beam L2 is kept aligned with the focal plane FP of the observation laser beam L1, the manipulation laser beam L2 irradiated by opening the shutter 21 is focused at the extremity A, as shown in FIG. 3, thus allowing the specimen P to be held at the extremity A.

At the same time, the control unit 20 cancels the preparation mode in which the shutter 21 is opened for the manipulation laser beam L2 and switches to the observation mode (step S6 in FIG. 8: mode-switching unit).

Figure 4:
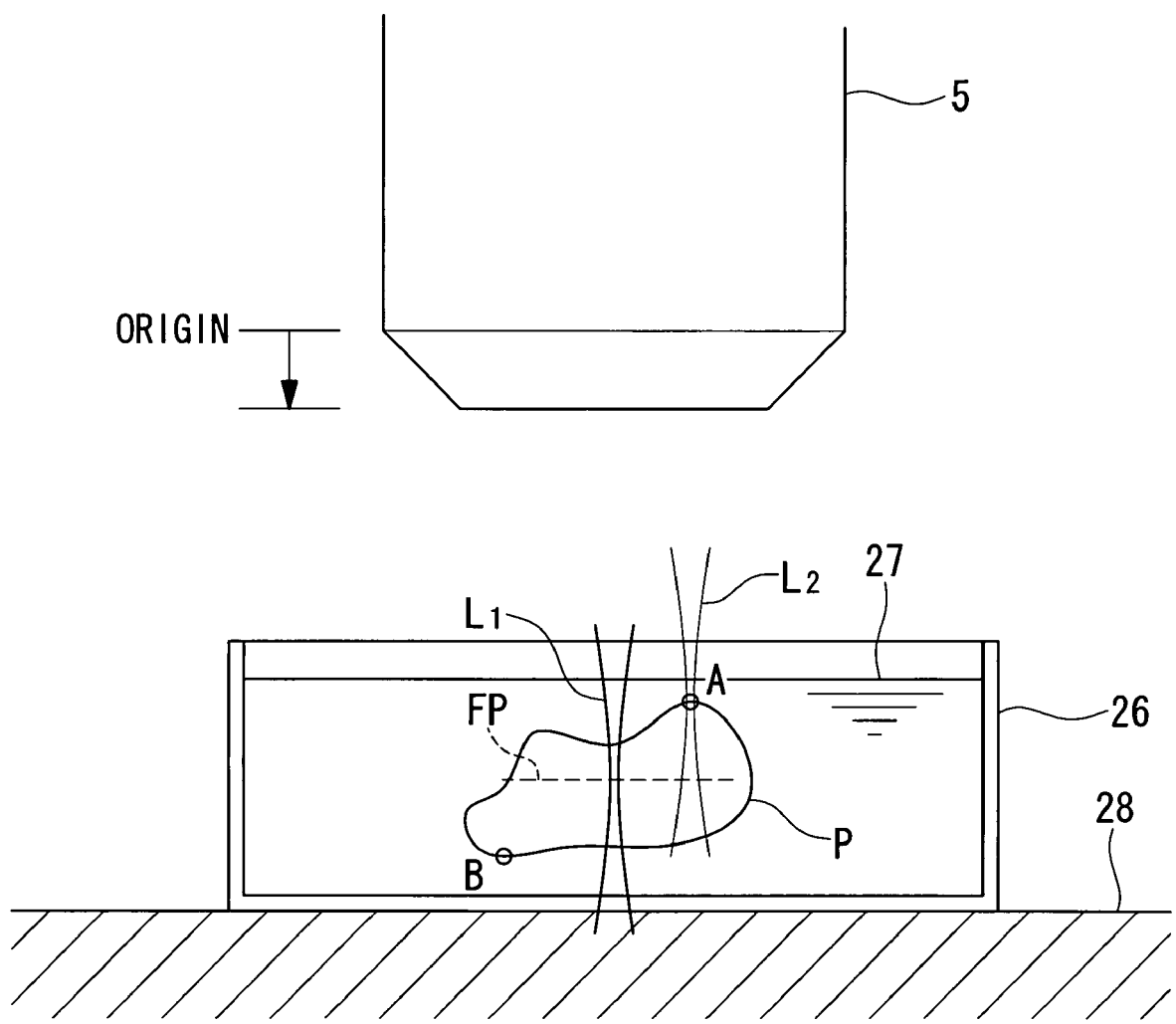
FIG. 4 is an explanatory diagram showing a state in which the focal plane of the observation laser beam is lowered from the origin position in FIG. 3.

Next, the operator operates the focusing mechanism 23 to lower the focal plane FP of the observation laser beam L1, as shown in FIG. 4. At this time, because the manipulation laser beam L3 is kept in the preparation mode in which the shutter 22 is closed, the focal position thereof is lowered according to the operation of the focusing mechanism 23, while remaining aligned with the focal plane FP of the observation laser beam L1.

On the other hand, regarding the manipulation laser beam L2, for which the preparation mode was cancelled and switched to the observation mode, the focal-position adjusting unit 18 and the focusing mechanism 23 are interlocked by the operation of the control unit 20. By doing so, the manipulation laser beam L2 can be moved together with the focal plane FP of the observation laser beam L1 by the focusing mechanism 23, and the focal-position adjusting unit 18 can be operated so that the focal position of the manipulation laser beam L2 is moved in the opposite direction by the same amount. As a result, as shown in FIG. 4, the manipulation laser beam L2 is kept in a state where the focal position holding the extremity A of the specimen P does not move, but remains stationary.

Figure 5:
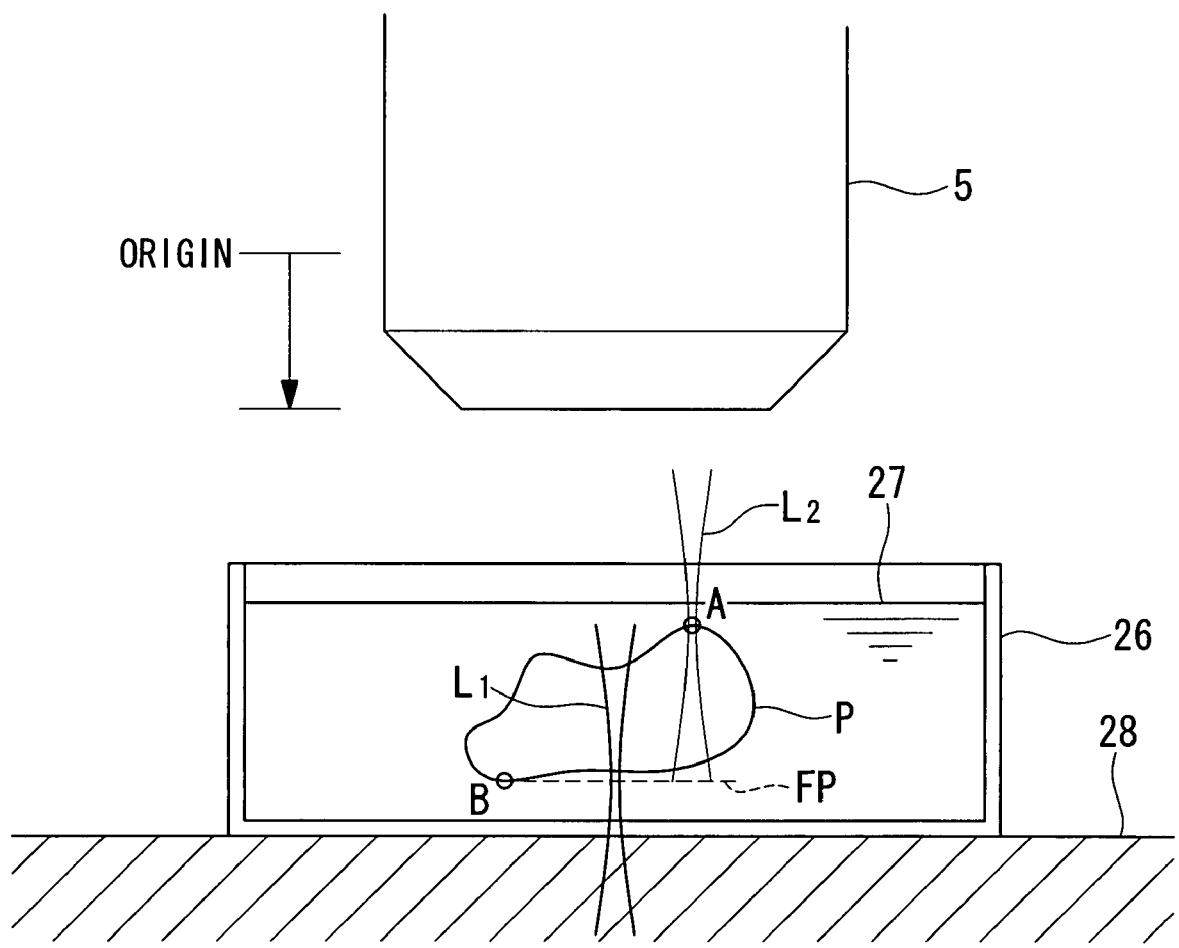
FIG. 5 is an explanatory diagram showing a state in which the focal plane of the observation laser beam from the laser-scanning microscope in FIG. 1 is aligned with the lowermost position of the specimen.

Then, the operator operates the focusing mechanism 23 to move the objective lens 5 so that, as shown in FIG. 5, the focal plane FP of the observation laser beam L1 is disposed close to the lowermost point of the specimen P, and operates the first scanner 8. In the example shown in FIG. 5, because the extremity B of the specimen P is at the lowermost position, a fluorescence image of a cross-section at the lowermost position, including the extremity B, is acquired (step S7 in FIG. 8).

Figure 6:
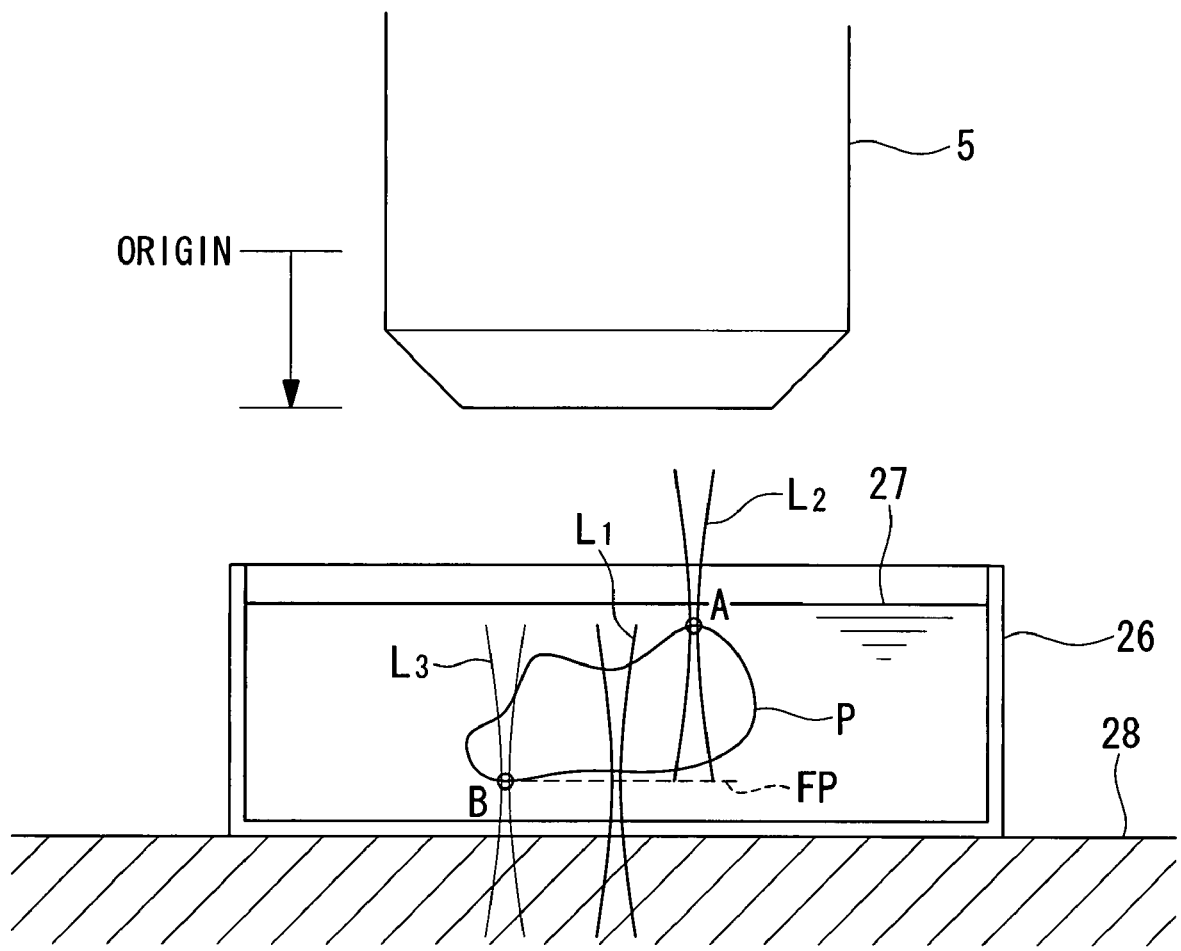
FIG. 6 is an explanatory diagram showing a state in which the specimen is irradiated with another manipulation beam in the state shown in FIG. 5.

While the operator checks the acquired fluorescence image on the monitor 24, he or she indicates the extremity B using the input unit, such as the mouse 25 (step S8 in FIG. 8). By doing so, because the gripping position of the optical tweezers to be formed by the other manipulation laser beam L3 is specified, the control unit 20 moves the second scanner 14 to two-dimensionally adjust the irradiation position of the manipulation laser beam L3 so as to coincide with the specified extremity B (step S9 in FIG. 8); thereafter, the shutter 22 in the light path of this manipulation laser beam L3 is opened to irradiate the specimen P with the manipulation laser beam L3, as shown in FIG. 6.

The manipulation laser beam L3 radiated by opening the shutter 22 is focused at the extremity B, thus allowing the specimen P to be held at the extremity B.

Figure 7:
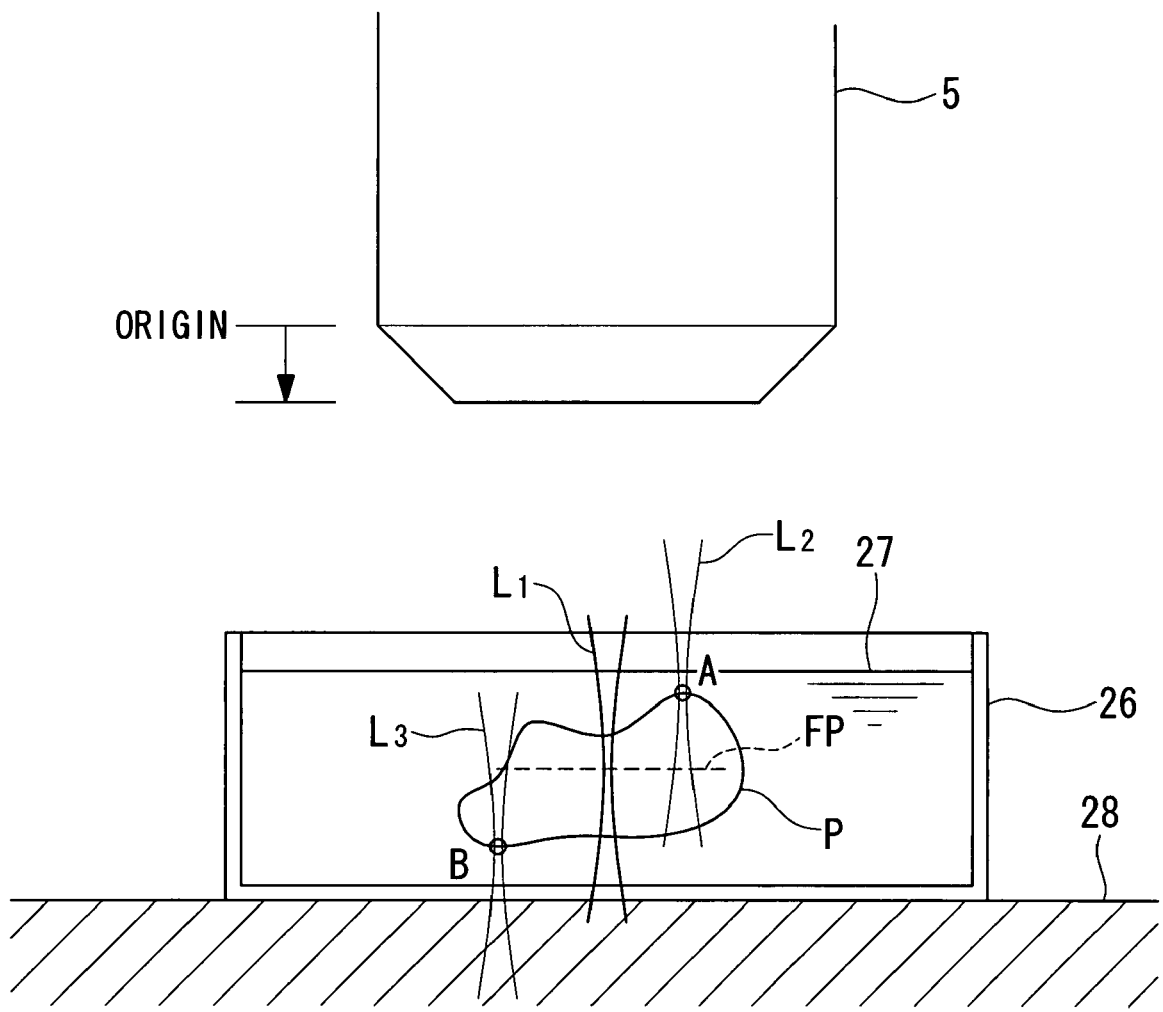
FIG. 7 is a diagram for explaining an observation mode in which the two manipulation laser beams are fixed in the state shown in FIG. 5 and only the observation laser beam is moved.

At the same time, the control unit 20 cancels the preparation mode in which the shutter 22 is opened for the manipulation laser beam L3 and switches to the observation mode (step S10 in FIG. 8: mode-switching unit). Accordingly, as shown in FIG. 7, even though the focusing mechanism 23 is operated to move the objective lens 5 in the optical axis direction, the manipulation laser beam L3 is also kept in a state in which the focal position holding the extremity B of the specimen P does not move, but remains stationary.

Thereafter, in the observation mode, even though the objective lens 5 is moved by operating the focusing mechanism 23 to move the focal plane FP of the observation laser beam L1, the focal positions of the two manipulation laser beams L2 and L3 holding the extremities A and B are kept in a stationary state. Therefore, due to the optical tweezers formed by the manipulation laser beams L2 and L3, while keeping the specimen P stationary at two positions, that is, at the extremities A and B, the focal plane FP of the observation laser beam L1 can be gradually moved to shift the acquisition position of the fluorescence image in the optical axis direction of the objective lens 5. Thus, by acquiring a plurality of fluorescence images shifted in the optical axis direction of the objective lens 5, it is possible to obtain a three-dimensional fluorescence distribution of the specimen P using these fluorescence images (step S11 in FIG. 8).

As described above, with the laser-scanning microscope 1 according to this embodiment, when the objective lens 5 is moved by operating the focusing mechanism 23, the focal-position adjusting units 18 and 19 are adjusted by the control unit 20 according to the amount of movement thereof; therefore, it is possible to perform focal-position adjustment taking account of the amount of shifting of the focal position of the manipulation laser beams according to the movement of the objective lens 5. Accordingly, even when the focal position of the observation laser beam continuously moves, it is possible to focus the manipulation laser beams at desired positions.

With the laser-scanning microscope 1 according to this embodiment, when the objective lens 5 moves in the observation mode where the specimen is irradiated with the manipulation laser beams L2 and L3, the control unit 20 controls the focal-position adjusting units 18 and 19 so as to cancel out the shift of the focal positions of the manipulation laser beams L2 and L3 according to that movement. Therefore, it is possible to fix the focal positions of the manipulation laser beams L2 and L3 relative to the specimen P. Accordingly, it is possible to move only the focal position of the observation laser beam L1 in the depth direction of the specimen, while performing optical stimulation or laser trapping at the same position of the specimen.

In other words, by interlocking the focusing mechanism 23 and the focal-position adjusting units 18 and 19 in the observation mode, it is possible to move only the focal plane FP of the observation laser beam L1, which irradiates the specimen P via the single objective lens 5, according to the movement of the objective lens 5, and to fix the focal positions of the manipulation laser beams L2 and L3. As a result, with the specimen P kept stationary, it is possible to move the focal plane FP of the observation laser beam L1 in the optical axis direction of the objective lens 5. It is thus possible to observe the three-dimensional fluorescence distribution without changing the condition of the specimen P and without applying an external force to the specimen P.

Furthermore, in the preparation mode where irradiation of the specimen with the manipulation laser beams is stopped, the control unit 20 controls the focal-position adjusting units 18 and 19 so that the focal position of the observation laser beam L1 and the focal positions of the manipulation laser beams L2 and L3 are coincident. Therefore, it is possible to maintain a state where the focal positions of the manipulation laser beams L2 and L3 are aligned with the focal position of the observation laser beam L1. Accordingly, when switching to the observation mode, it is possible to enter a state where the focal positions of the observation laser beam L1 and the manipulation laser beams L2 and L3 coincide, which allows observation to commence smoothly.

With the laser-scanning microscope 1 described above, the focal positions of the two separated manipulation laser beams L2 and L3 are adjusted in the optical axis direction of the objective lens 5 by the focal-position adjusting units 18 and 19, respectively, and are two-dimensionally adjusted in directions intersecting the optical axis of the objective lens 5 by the second scanners 13 and 14. Then, after the two manipulation laser beams L2 and L3 whose focal positions are adjusted are multiplexed by the polarizing beam splitter 15, they are multiplexed with the observation laser beam L1 by the dichroic mirror 4. Therefore, the fluorescence F collected by the objective lens 5 does not pass right through the polarizing beam splitter 15. As a result, even when radiating the two manipulation laser beams L2 and L3, the loss of the fluorescence F at the point where the manipulation laser beams L2 and L3 and the observation laser beam L1 are multiplexed does not become large, which affords an advantage in that it is possible to acquire bright fluorescence images.

Because the two manipulation laser beams L2 and L3 are multiplexed by means of the π/2 plate 17 and the polarizing beam splitter 15, it is possible to use a single manipulation-laser-beam light source 11, thus reducing the size of the apparatus. In addition, by reducing the loss of the manipulation laser beams L2 and L3, it is possible to eliminate waste, thus allowing the electrical power consumption to be reduced.

In this embodiment, the manipulation laser beams L2 and L3 emitted from the single manipulation-laser-beam light source 11 are separated by the half-mirror 12. Instead of this, however, it is possible to provide a manipulation-laser-beam light source 11 for each of the manipulation laser beams L2 and L3. In such a case, by disposing the manipulation-laser-beam light sources 11 so that their angles differ by 90°, it is possible to use the two manipulation laser beams L2 and L3 whose polarization directions are mutually orthogonal.

Although a description has been given of a case in which the two manipulation laser beams L2 and L3 are used, instead of this, it is possible to use three or more manipulation laser beams. In such a case, after multiplexing two manipulation laser beams in a similar manner to that described above, the two multiplexed laser beams should then be multiplexed with the other manipulation laser beam.

Although a description has been given of a case in which the manipulation laser beams L2 and L3 are used as optical tweezers, they may be used for optical stimulation. By doing so, it is possible to acquire the three-dimensional fluorescence distribution of the specimen P while applying an optical stimulus to two or more fixed positions.

Although the focusing mechanism 23 has been described as moving the objective lens 5 along the optical axis direction, instead, it is possible to move a stage 28 supporting the specimen P in the optical axis direction, while keeping the objective lens 5 stationary.

In this embodiment, while keeping the different extremities A and B of the specimen P stationary using the two manipulation laser beams L2 and L3 as optical tweezers, the objective lens 5 is moved in the optical axis direction by operating the focusing mechanism 23 to move the focal plane FP of the observation laser beam L1 in the optical axis direction. Instead of this, however, after gripping the extremities A and B with the optical tweezers, the specimen P can be moved in the optical axis direction of the objective lens 5 by operating the focal-plane adjusting units 18 and 19.

By doing so, it is possible to acquire the three-dimensional fluorescence distribution of the specimen P without moving the objective lens 5 or the stage 28 with the focusing mechanism 23. As a result, it is not necessary to provide a motor for generating a large driving force for moving the objective lens 5 or the stage 28, which allows the apparatus to be reduced in size.

What is claimed is:

1. A laser-scanning microscope comprising:
an observation-laser-beam light source configured to emit an observation laser beam;
a manipulation-laser-beam light source configured to emit a manipulation laser beam for manipulating a specimen;
a scanning unit configured to two-dimensionally scan the observation laser beam;
a laser-beam position adjusting section configured to two-dimensionally adjust an irradiation position of the manipulation laser beam;
a focal-position adjusting unit configured to move a focal position of the manipulation laser beam in an optical axis direction;
a multiplexer configured to multiplex the observation laser beam scanned by the scanning unit and the manipulation laser beam adjusted by the laser-beam position adjusting section and the focal-position adjusting unit;
an objective lens configured to focus the observation laser beam and the manipulation laser beam multiplexed by the multiplexer to irradiate the specimen, as well as to collect fluorescence generated in the specimen;
a light detector configured to detect the fluorescence collected by the objective lens;
a Z-axis driving unit configured to move, in the optical axis direction, the objective lens or a stage on which the specimen is mounted;
a controller configured to control the focal-position adjusting unit and an amount of movement of the objective lens or the stage via the Z-axis driving unit; and
a mode-switching unit configured to switch between a preparation mode in which the controller controls the focal-position adjusting unit so that the focal plane of the observation laser beam and the focal position of the manipulation laser beam are coincident, independent of the movement of the objective lens or the stage by the Z-axis driving unit, and an observation mode in which the controller controls the focal-position adjusting unit so as to cancel out a shift of the focal position of the manipulation laser beam with respect to the specimen according to the movement of the objective lens or the stage.

2. A microscope observation method in which an observation laser beam for observing a specimen and a manipulation laser beam for manipulating a specimen are multiplexed, wherein the multiplexed beams irradiate the specimen, which is mounted on a stage, via an objective lens, and wherein fluorescence emitted from inside the specimen is detected, said method comprising:

activating a preparation mode in which, while radiation of the manipulation laser beam to the specimen is stopped, a focal position of the manipulation laser beam is adjusted so that a focal plane of the observation laser beam and the focal position of the manipulation laser beam are coincident, independent of movement in an optical axis direction of the objective lens or the stage, and switching from the preparation mode to an observation mode in which radiation of the manipulation laser beam to the specimen is started and the focal position of the manipulation laser beam is adjusted so as to cancel out a shift of the focal position of the manipulation laser beam with respect to the specimen according to the movement in the optical axis direction of the objective lens or the stage, when the focal position of the manipulation laser beam reaches a desired position.

3. A microscope observation method according to claim 2, wherein the adjustment of the focal position of the manipulation laser beam is performed in synchronization with detecting the fluorescence of the specimen.

4. The laser-scanning microscope according to claim 1, wherein the mode-switching unit is configured to activate the preparation mode while radiation of the manipulation laser beam to the specimen is stopped, and to switch from the preparation mode to the observation mode to commence irradiation of the specimen with the manipulation laser beam.

5. The laser-scanning microscope according to claim 1, wherein:

a plurality of light paths of the manipulation laser beam are provided, the laser-beam position adjusting section comprises a plurality of laser-beam position adjusting units provided on the plurality of the light paths of the manipulation laser beam, respectively, so that each of the laser-beam position adjusting units is independently capable of two-dimensionally adjusting an irradiation position of the manipulation laser beam, and a manipulation laser-beam multiplexer is disposed between the laser-beam position adjusting units and the multiplexer to multiplex the plurality of the light paths of the manipulation laser beam into one light path.

6. The laser-scanning microscope according to claim 5, wherein the focal-position adjusting unit is independently provided for each of the laser-beam position adjusting units on each of the light paths of the manipulation laser beam to adjust the focal position of each of the manipulation laser beams.

7. The microscope observation method according to claim 2, wherein the focal position of the manipulation laser beam is adjusted by irradiating the specimen with the observation laser beam to perform observation of the specimen, while the preparation mode is activated, and by switching from the preparation mode to the observation mode, while the irradiation position of the manipulation laser beam is two-dimensionally specified after a desired observation image of the specimen is acquired at the focal plane, using the acquired observation image.

8. The laser-scanning microscope according to claim 1, wherein the Z-axis driving unit is configured to move the objective lens in the optical axis direction and the controller is configured to control the amount of movement of the objective lens.

9. The laser-scanning microscope according to claim 1, wherein the Z-axis driving unit is configured to move the stage on which the specimen is mounted and the controller is configured to control the amount of movement of the stage.

10. The laser-scanning microscope according to claim 1, wherein the controller is configured to control the focal-position adjusting unit to adjust of the focal position of the manipulation laser beam in synchronization with detection by the light detector of the fluorescence collected by the objective lens.

11. The laser-scanning microscope according to claim 1, wherein the mode-switching unit is configured to activate the preparation mode while radiation of the manipulation laser beam to the specimen is stopped, and to switch from the preparation mode to the observation mode when the focal position of the manipulation laser beam reaches a desired position.

* * * * *